(12) United States Patent
Gensewich et al.

(10) Patent No.: US 10,737,415 B2
(45) Date of Patent: Aug. 11, 2020

(54) FORMING A PROFILED PREPREG COMPONENT

(71) Applicant: Premium Aerotec GmbH, Augsburg (DE)

(72) Inventors: Christian Gensewich, Nordenham (DE); Fred Eisenbeiss, Eckwarden (DE)

(73) Assignee: Premium Aerotec GmbH, Augsburg (DE)

( * ) Notice: Subject to any disclaimer, the term of this patent is extended or adjusted under 35 U.S.C. 154(b) by 1192 days.

(21) Appl. No.: 14/359,801

(22) PCT Filed: Nov. 22, 2012

(86) PCT No.: PCT/DE2012/001112
§ 371 (c)(1),
(2) Date: Nov. 26, 2014

(87) PCT Pub. No.: WO2013/075694
PCT Pub. Date: May 30, 2013

(65) Prior Publication Data
US 2015/0158211 A1 Jun. 11, 2015

(30) Foreign Application Priority Data

Nov. 22, 2011 (DE) .................. 10 2011 119 046

(51) Int. Cl.
*B29C 43/12* (2006.01)
*B29C 70/44* (2006.01)
(Continued)

(52) U.S. Cl.
CPC .......... *B29C 43/12* (2013.01); *B29C 43/3642* (2013.01); *B29C 70/44* (2013.01); *B29L 2031/001* (2013.01)

(58) Field of Classification Search
CPC ....... B29C 70/44; B29C 70/443; B29C 70/46; B29C 43/3642; B29C 43/12;
(Continued)

(56) References Cited

U.S. PATENT DOCUMENTS 3,270,111 A * 8/1966 Haldemann .......... B29D 24/008
264/231
3,305,420 A * 2/1967 Brownlee ........... B29C 66/1222
156/217
(Continued)

FOREIGN PATENT DOCUMENTS

DE 2 039 930 A1 2/1971
DE 10 2004 025 704 A1 12/2005
(Continued)

OTHER PUBLICATIONS

International Search Report dated Apr. 18, 2013 with English translation (seven (7) pages).
(Continued)

*Primary Examiner* — Seyed Masoud Malekzadeh
(74) *Attorney, Agent, or Firm* — Crowell & Moring LLP

(57) ABSTRACT

A shaping device for producing a profiled component includes a lay-on unit, a press-on unit and a pressure application unit. The lay-on unit has a support surface for laying on a semi-finished product to be shaped. The press-on unit presses a semi-finished product to be shaped onto the support surface. The pressure application unit has, at least on the side that faces the semi-finished product, a bendable shell for lying on the semi-finished product in an unshaped first state and for lying thereon in a shaped second state, as well as a pressure-transmitting and deformable filling. The pressure application unit can be arranged between the press-on unit and a semi-finished product to be shaped. The press-on unit has a bendable surface lying on the pressure application unit, which bendable surface transmits the force (Continued)

for the shaping onto the pressure application unit. The semi-finished product to be shaped may be a fibre-reinforced composite material.

11 Claims, 8 Drawing Sheets

(51) Int. Cl.
*B29C 43/36* (2006.01)
*B29L 31/00* (2006.01)

(58) Field of Classification Search
CPC ...... B29C 2043/3644; B29C 2043/366; B29C 2043/3649; B29C 2043/3647; B29C 2043/3652; B29C 2043/3655; B29C 2043/3657; B29C 70/446
See application file for complete search history.

(56) References Cited

U.S. PATENT DOCUMENTS

| | | | | |
|---|---|---|---|---|
| 3,614,811 A * | 10/1971 | Johnson | ............... | B29C 51/28 425/389 |
| 3,902,944 A * | 9/1975 | Ashton | ............... | B29C 53/584 156/156 |
| 4,038,014 A * | 7/1977 | Dusza | ............... | B29D 11/00009 425/388 |
| 4,047,870 A * | 9/1977 | Smaldone | ............... | B29C 51/28 425/151 |
| 4,608,220 A | 8/1986 | Caldwell et al. | | |
| 5,131,834 A * | 7/1992 | Potter | ............... | B29C 43/206 156/224 |
| 5,242,652 A * | 9/1993 | Savigny | ............... | B29C 43/021 264/101 |
| 5,328,540 A * | 7/1994 | Clayton | ............... | B29C 33/34 156/285 |
| 5,374,388 A * | 12/1994 | Frailey | ............... | B29C 33/3821 156/285 |
| 5,464,337 A * | 11/1995 | Bernardon | ............... | B29C 33/302 264/257 |
| 5,578,158 A * | 11/1996 | Gutowski | ............... | B29C 70/44 156/222 |
| 5,885,509 A * | 3/1999 | Kristinsson | ............... | A61F 2/5046 264/314 |
| 6,551,091 B1 * | 4/2003 | Bryant | ............... | B29C 43/3642 264/316 |
| 6,896,841 B2 * | 5/2005 | Velicki | ............... | B29C 65/00 264/510 |
| 7,306,692 B2 * | 12/2007 | Graham | ............... | B29C 43/3642 156/285 |
| 8,926,301 B2 * | 1/2015 | Giraud | ............... | B29C 35/04 425/14 |
| 2002/0185785 A1 * | 12/2002 | Thrash | ............... | B29C 70/443 264/571 |
| 2004/0000745 A1 * | 1/2004 | Channer | ............... | B29C 70/443 264/511 |
| 2004/0183227 A1 * | 9/2004 | Velicki | ............... | B29C 65/00 264/236 |
| 2005/0140033 A1 * | 6/2005 | Jiang | ............... | B29D 11/0073 264/1.7 |
| 2008/0308960 A1 * | 12/2008 | Rydin | ............... | B29C 43/56 264/102 |
| 2009/0039566 A1 * | 2/2009 | Rodman | ............... | B29C 70/446 264/529 |
| 2009/0041972 A1 * | 2/2009 | Rodman | ............... | B29C 70/44 428/85 |
| 2009/0155521 A1 * | 6/2009 | Rodman | ............... | B29C 70/44 428/96 |
| 2010/0136232 A1 * | 6/2010 | Walker | ............... | B29C 35/049 427/248.1 |
| 2010/0164147 A1 * | 7/2010 | Rodman | ............... | B29C 43/3642 264/503 |
| 2010/0181017 A1 * | 7/2010 | Shinoda | ............... | B29C 33/04 156/242 |
| 2010/0251908 A1 * | 10/2010 | Yoshida | ............... | B29C 43/18 100/38 |
| 2012/0043704 A1 * | 2/2012 | Hawkins | ............... | B29C 70/342 264/511 |
| 2012/0256348 A1 * | 10/2012 | Bergmann | ............... | B29C 51/085 264/316 |
| 2013/0099427 A1 | 4/2013 | Llopart Prieto et al. | | |
| 2013/0154154 A1 * | 6/2013 | Rodman | ............... | B29C 43/003 264/257 |
| 2013/0175731 A1 * | 7/2013 | Doddman | ............... | B29C 70/446 264/250 |
| 2013/0299072 A1 * | 11/2013 | Hattori | ............... | B29C 70/44 156/242 |
| 2016/0200015 A1 * | 7/2016 | Barlag | ............... | B29C 43/18 425/112 |

FOREIGN PATENT DOCUMENTS

| | | |
|---|---|---|
| DE | 10 2010 014 545 A1 | 10/2011 |
| EP | 0 733 454 B1 | 12/1998 |
| EP | 2 070 678 A1 | 6/2009 |
| EP | 2 253 460 A2 | 11/2010 |
| JP | 11-268067 A | 10/1999 |
| RU | 2 217 312 C2 | 11/2003 |
| WO | WO 2008/119114 A1 | 10/2008 |

OTHER PUBLICATIONS

German Office Action issued in German counterpart application No. 10 2011 119 046.9 dated Jul. 24, 2012 (Four (4) pages).
German Office Action issued in German counterpart application No. 10 2011 119 046.9 dated Nov. 27, 2014 (Three (3) pages).
European Office Action issued in European counterpart application No. 12 813 740.3-1706 dated Jun. 8, 2015 (Four (4) pages).
Russian Office Action issued in Russian counterpart application No. 2014125132/05(040885) dated Oct. 3, 2016 (Four (4) pages).
Russian Decision to Grant issued in Russian counterpart application No. 2014125132/05(040885) dated Feb. 20, 2017 (Eleven (11) pages).
Canadian Search Report issued in Canadian counterpart application No. 2,856,544 dated Jul. 18, 2018 (Three (3) pages).
Brazilian Office Action issued in Brazilian counterpart application No. BR112014012341-1 dated Sep. 26, 2019, with partial English translation (Five (5) pages).

* cited by examiner

FORMING A PROFILED PREPREG COMPONENT

BACKGROUND AND SUMMARY OF THE INVENTION

Exemplary embodiments of the present invention relate to a shaping apparatus for manufacturing a profiled component and a method for producing a profiled component.

Profiled components are used for example in vehicle structures, e.g. in load-dissipating structures. Profiled components are used, for example, as curved structural components in the hull construction of an aircraft, for example an airplane, for example as a stringer or a rib. The profiled components are produced, for example, from a flat semi-finished product by a corresponding shaping process. In line with efforts towards achieving reduced fuel consumption and the concomitant strive towards minimizing weight, profiled components are made, for example, from a fiber-reinforced composite material. To this end, for example fibrous structures, together with a matrix material, are laid onto a template having the corresponding profile and are subsequently cured into the finished profiled component using compression and heating steps. In order to apply the required pressure vacuum films are used that extend over the laid-out semi-finished product in the form of the fiber layers, which may, for example, be impregnated with a matrix material, so that as a result of the application of a vacuum in the region between a base plate and the vacuum film, a corresponding pressure can be applied onto the semi-finished product. In the course of this, the semi-finished product is made to lie against the underlying template. Apart from laying out individual fiber layers into the given template, also mats prepared as so-called prepregs are used, which are made up from a plurality of layers of fiber mats and a binder or matrix material applied thereto, so that the mat laid out on the template will initially only approximately adapt to the template and will not lie exactly against it. The exact laying-on process, which to a certain extent is a reshaping, is then carried out using a vacuum film. Therefore, also the term diaphragm shaping is used for this method. When manufacturing profiled components, it is also known to assemble individual profiled segments into a profiled component. For example, flat profiled regions may be combined with a so-called omega profile in order to form a type of hollow profile. The connection is then carried out by bonding, e.g. under the effect of heat and pressure. European patent document EP 2 253 460 A2 discloses a connection system for composite and metal components, wherein the regions to be connected are pressed against each other by pressure chambers, the pressure chambers are equipped with a stretchable and elastically deformable membrane, so that in the pressure chamber, a pressure may be applied via a fluid so as to act uniformly onto the surfaces to be joined. The surfaces to be joined are preformed, so that the elastic membrane ensures a uniform pressing on. The pressure chambers are accommodated in housing structures having an elastically deformable membrane only in the region of the joint to be pressed together. However, in order to join a plurality of profile regions, the method known from European patent document EP 2 253 460 A2 requires the prefabrication of the individual already finish-profiled profile elements. However, it has been shown that the handling of fiber mats, for example prepregs, and the required placing into a template structure is complex and therefore cost-intensive. Moreover, the pressing on of a semi-finished product by way of diaphragm shaping is insufficient in the case of tight internal radii, because in these regions, only insufficient pressure can be applied by means of the vacuum film.

Exemplary embodiments of the present invention are directed to providing a simplified way of manufacturing a profiled component having an improved component quality.

According to the invention, a shaping apparatus for manufacturing a profiled component is provided, wherein the shaping apparatus includes a lay-on unit, a press-on unit and a pressure application unit. The lay-on unit includes a support surface for laying on a semi-finished product to be shaped. The press-on unit is provided for pressing a semi-finished product to be shaped against the support surface. The pressure application unit has, at least on the side that faces the semi-finished product, a bendable shell for lying against the semi-finished product in an unshaped first state and for lying on in a shaped second state, as well as a pressure-transmitting and deformable filling. The pressure application unit can be disposed between the press-on unit and a semi-finished product to be shaped. The press-on unit has a bendable surface that lies on the pressure application unit, which bendable surface transmits the force for the shaping onto the pressure application unit.

The term "profiled" relates, for example, to an elongated component that is formed with a profiled cross-section. The term "profiled" also relates to an elongated component that is curved in a longitudinal direction. Moreover, "profiled" also relates to a component that is formed with a cross-sectional profile in the transverse direction and that is moreover formed in a curved manner in the longitudinal direction.

The term "shaping" comprises, for example, the laying of an initially flat semi-finished product, for example of a more or less flat semi-finished product, on a support surface that is provided as a shape-imparting structure.

The term "bendable shell" relates to an enveloping material that may be bent or deformed like a film and which can therefore be adapted to various profiles, however which is not stretchable or elastic in its longitudinal direction, i.e. in the direction of the enveloping surface. The bendable shell must in any case be capable of maintaining the enclosed volume, i.e. it must be possible for an applied pressure to be also transmitted.

The term "bendable surface" relates to a surface for lying on the pressure application unit, which at least at the level of the surface is soft enough to conform to the different contours of the pressure application unit. The bendable surface may be formed as a tension-resistant membrane or film. The bendable surface may also be formed as an elastic membrane or film. The bendable surface may also be a laminate having a conformable shape, i.e. surface shape, or a bendable plate element.

According to one exemplary embodiment the semi-finished product to be shaped is a fiber-reinforced composite material.

For example, the fiber-reinforced composite material includes a composite laminate. The term "composite laminate" refers to a material that may include, in addition to a fiber-reinforced composite material, further material layers and/or material inserts, such as e.g. a metal fabric, a metal foil and the like. The shaped semi-finished product will then be used, upon passing through further operating steps, as a stringer or a rib on an aircraft. The further operating steps may include, for example, curing the profiled semi-finished product shaped.

The support surface includes, for example, concave or recessed regions, e.g. regions with interior edges and/or interior corners.

The support surface forms a template counter-piece for shaping the semi-finished product to be shaped.

The semi-finished product to be shaped is provided e.g. as an inherently stable plate, i.e. as a self-supporting plate, which after having been laid onto the support surface, will not or only to a very minor extent adapt to the structure of the support surface underneath it.

According to a further embodiment, the pressure application unit is provided all around with a bendable shell.

For example, the pressure application unit forms a bladder filled with a fluid.

According to a further embodiment, the bendable surface of the press-on unit lies on the one side of the pressure application unit, and on the other side, a pressure can be applied thereto via a fluid for transmitting the force for the shaping. For the pressure application it is provided that:
i) the bendable surface forms a volume onto which pressure can be applied; or
ii) the bendable surface is a vacuum membrane, with a vacuum unit being provided for generating a negative pressure in a region between the vacuum membrane and the support surface in such a way that ambient air pressure acting from the outside on the vacuum membrane effects a shaping by laying the semi-finished product onto the support surface.

The volume onto which pressure can be applied is filled for example with a fluid, e.g. with pressurized air or another pressure-transmitting medium such as water or oil, or a pressure is applied onto the fluid.

The vacuum membrane is, for example, a vacuum film. The vacuum unit is for example a vacuum pump that is in communication with the region between the vacuum membrane and the support surface.

In one example, the pressure application unit is integrated into the vacuum membrane.

For example, the vacuum membrane is designed in multiple layers and includes, at least partly, a cavity that is provided with the pressure-transmitting and deformable filling.

According to a further embodiment, the bendable surface of the press-on unit is held by holding points in such a way that the bendable surface forms a convex contour both in the unshaped first state and in the shaped second state. Tension stress can be applied onto the bendable surface for transmitting the force for the shaping.

In a further example, the pressure application unit is integrated into the bendable surface, e.g. integrated in a film that can be subjected to tensile stress.

According to a further embodiment, the pressure application unit has as a filling at least one member of the group of gaseous fluids, liquids, gels and loose bulk solids.

For example, the pressure-transmitting and deformable filling includes a fluid medium. According to one example, the liquid is stable under pressure. The filling may e.g. be a highly viscous filling.

According to a further embodiment, the filling of the pressure application unit may have a dynamic viscosity of at least 100 Pa·s.

According to a further embodiment example, the pressure application unit has such a volume that, when the pressure application unit lies on the support surface, all of the recesses of the support surface are filled by the pressure application unit, so that the vacuum membrane forms a convex enveloping surface.

The recesses form for example concave shape regions.

The forming of a convex enveloping surface in a maximally compressed state offers, for example, the advantage that while vacuum is applied, the vacuum membrane is at no point stretched again in relation to the underlying pressure application unit, or is as it were relaxed, as would be the case if the vacuum membrane initially formed a convex enveloping surface and would, during further shaping, form an enveloping surface with concave regions.

According to one embodiment example, the pressure application unit includes a replaceable pressure application element.

According to a further embodiment example, the pressure application unit includes a plurality of pressure application elements, which may for example, also be designed to be replaceable.

For example, several pressure application elements are provided next to each other, one after the other and/or on top of each other (in the direction of the applied pressure).

It is also possible to combine a number of pressure application elements to form one pressure application unit.

For example, a pressure application unit, or a pressure application element, may also be designed with a plurality of chambers, e.g. by means of inserted partitions, which at least reduce, or even completely stop, the flow or movement of the filling from one chamber to the next.

According to a further embodiment the pressure application unit can be tempered and that the pressure application unit can be used to supply thermal energy to a semi-finished product to be shaped, and/or can also be discharged therefrom.

According to a further embodiment, the support surface is replaceable and various surface profiles may be inserted.

According to the invention, a method for producing a profiled component is provided, which comprises the following steps:
a) arranging a semi-finished product to be shaped on a support surface of a lay-on unit;
b) arranging a pressure application unit on the semi-finished product that includes, at least on the side that faces the semi-finished product, a bendable shell to lie against the semi-finished product in an unshaped first state and to lie on in a shaped second state, and a pressure-transmitting and deformable filling;
c) arranging a press-on unit on the pressure application unit, wherein the press-on unit has a bendable surface that lies on the pressure application unit, where the bendable surface is used to transmit the force for the shaping onto the pressure application unit;
d) pressing the semi-finished product to be shaped against the support surface by means of the press-on unit via the pressure application unit and shaping it at the same time.

According to an exemplary embodiment of the method, the bendable surface of the press-on unit lies on the one side on the pressure application unit and on the other side, a pressure is applied thereto via a fluid for transmitting the force for the shaping. Moreover, it is provided for the pressure application that:
i) the bendable surface forms a volume onto which pressure may be applied; or
ii) the bendable surface is a vacuum membrane, and wherein in step (d) a negative pressure is generated in a region between the vacuum membrane at the support surface by means of a vacuum unit, so that air pressure acting from the outside on the vacuum membrane acts via the pressure application unit and effects shaping by laying the semi-finished product against the support surface.

According to an exemplary embodiment, the bendable surface of the press-on unit is held by holding points in such a way that the bendable surface forms a convex contour both in the unshaped first state and in the shaped second state, and a tensile stress is applied onto the bendable surface for transmitting the force for the shaping.

For example, the bendable surface, which is formed e.g. as a film, is held by a first lateral edge on a base surface, on which the support surface of the lay-on unit is provided. The film is now laid over the semi-finished product to be shaped and a tensile stress is applied onto a second lateral edge, so that the film exerts a compressive force onto the pressure application unit, which ultimately acts on the semi-finished product.

According to a further embodiment example, in order to soften the semi-finished product, the latter is tempered by the pressure application unit prior to step (d).

According to the present invention, also the use of the apparatus described above is provided for producing a profiled component.

According to the invention, a flexible element is used for shaping a semi-finished product, which due to its capability of lying intimately against it, effects an improved shaping of the semi-finished product by way of an improved pressing on of the semi-finished product especially on internal radii. The pressure-transmitting and deformable filling may, for example, also be used as a heat transfer medium, in order to heat for example a semi-finished product provided as a laminate and also to soften it in order to support the shaping operation. By using a medium with a higher viscosity, such as e.g. a gel, the pressure-transmitting intermediate body may also be used in regions where, for example, due to gravity, an unfavorable flowing off or migrating of the filling might occur. For example, compared to a rigid compression die, the deformable element provided according to the invention may be used to achieve a good degree of shaping during the shaping of the semi-finished product and also in the case of slightly deviating shapes, in particular in the case of varying internal radii or internal edges or internal corners. Unlike rigid shaping dies, the shaping apparatus can be used, as a result of the flexibility of the pressure element, without setting up time for various sub-templates. The flexible intermediate element effects an improved pressing against the shaped structure underneath it.

It should be noted the features of the embodiment examples and of the apparatus also apply to the embodiments of the method as well as to the use of the apparatus, and vice versa. Moreover, also those features may be freely combined where this has not been explicitly mentioned.

BRIEF DESCRIPTION OF THE DRAWING FIGURES

Embodiment examples of the invention will be explained in more detail below by means of the attached drawings, wherein:

FIG. 10 shows a further example of a shaping apparatus during the shaping process;

FIG. 11 shows the example of FIG. 10 after the shaping;

FIG. 12 shows a further example of a shaping apparatus; and

FIG. 13 shows yet a further example of a shaping apparatus.

DETAILED DESCRIPTION

Figure 1:
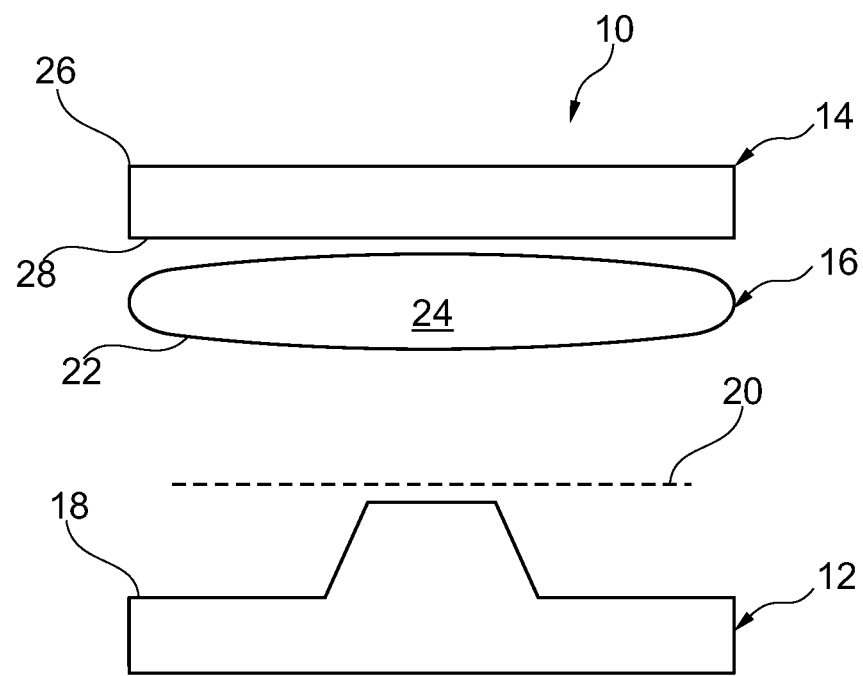
FIG. 1 shows an embodiment example of a shaping apparatus for producing a profiled component according to the present invention.

FIG. 1 shows a shaping device 10 for producing a profiled component. To this end, a lay-on unit 12, a press-on unit 14 and a pressure application unit 16 are shown.

The lay-on unit 12 has a support surface 18 for supporting a semi-finished product to be shaped, which is indicated by a dotted line 20.

The press-on unit 14 is provided for pressing a semi-finished product to be shaped onto the support surface 18.

The pressure application unit 16 includes, at least on the side that faces the semi-finished product, a bendable shell 22 and a pressure-transmitting and deformable filling 24. Moreover, the pressure application unit 16 may be disposed between the press-on unit 14 and a semi-finished product to be shaped 20.

For example, the pressure application unit 16 may be formed to run around with the bendable shell 22 and may form a bladder that is filled with a fluid.

It should be noted that the shaping device 10 is shown only in a schematic form and that the press-on unit 14, the pressure application unit 16 and the lay-on unit 12 may also have other shapes or profiles, which will also be shown below.

The press-on unit 14 has a bendable surface that lies on the pressure application unit, which bendable surface transmits the force for the shaping onto the pressure application unit.

For example, the bendable surface 26 of the press-on unit 14 lies on the one side on the pressure application unit 16, and on the other side 28, pressure can be applied thereto via a fluid for transmitting the force for the shaping. For the pressure application, the bendable surface can form a volume onto which pressure can be applied (see also FIG. 10 et seq.).

The volume onto which pressure can be applied may e.g. be filled with a fluid such as (pressurized) air, oil or water.

Figure 2:
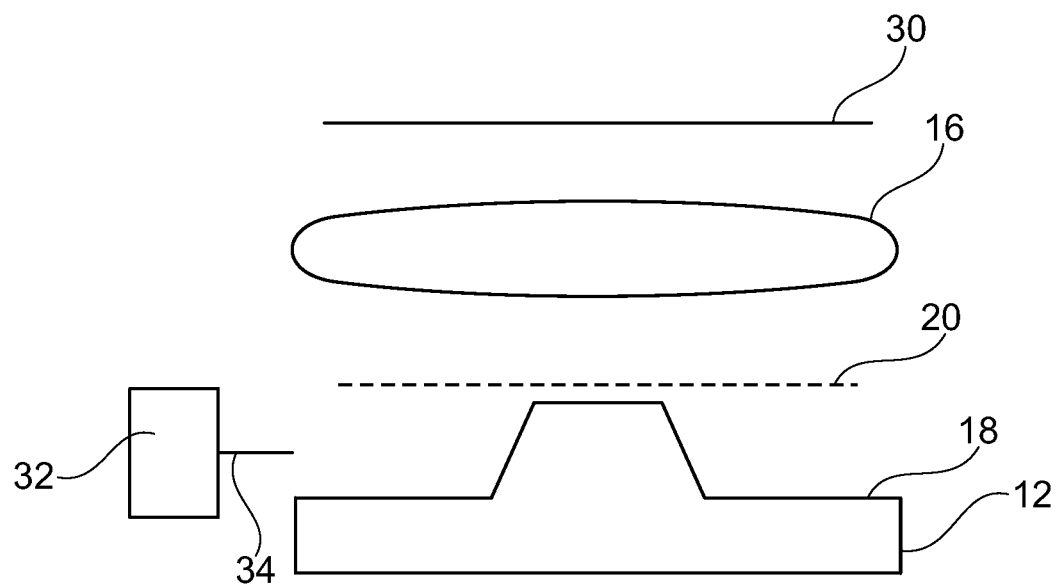
FIG. 2 shows a further embodiment example of a shaping apparatus according to the present invention.

FIG. 2 shows an embodiment, wherein the bendable surface of the press-on unit 14 is a vacuum membrane 30. Moreover, a vacuum unit 32, for example a vacuum pump, is provided for generating a negative pressure in a region between the vacuum membrane and the support surface in such a way that air pressure acting from the outside onto the vacuum membrane effects shaping by pressing the semi-finished product onto the support surface. FIG. 2 shows a schematic view of a connection 34 of the vacuum unit 32 with the region between the vacuum membrane 30 and the support surface 18. It should be noted that any connections and seals of the vacuum membrane 30 in relation to the support surface 18 as may be necessary for generating a vacuum in the intermediate region are not shown in FIG. 2.

Figure 3A:
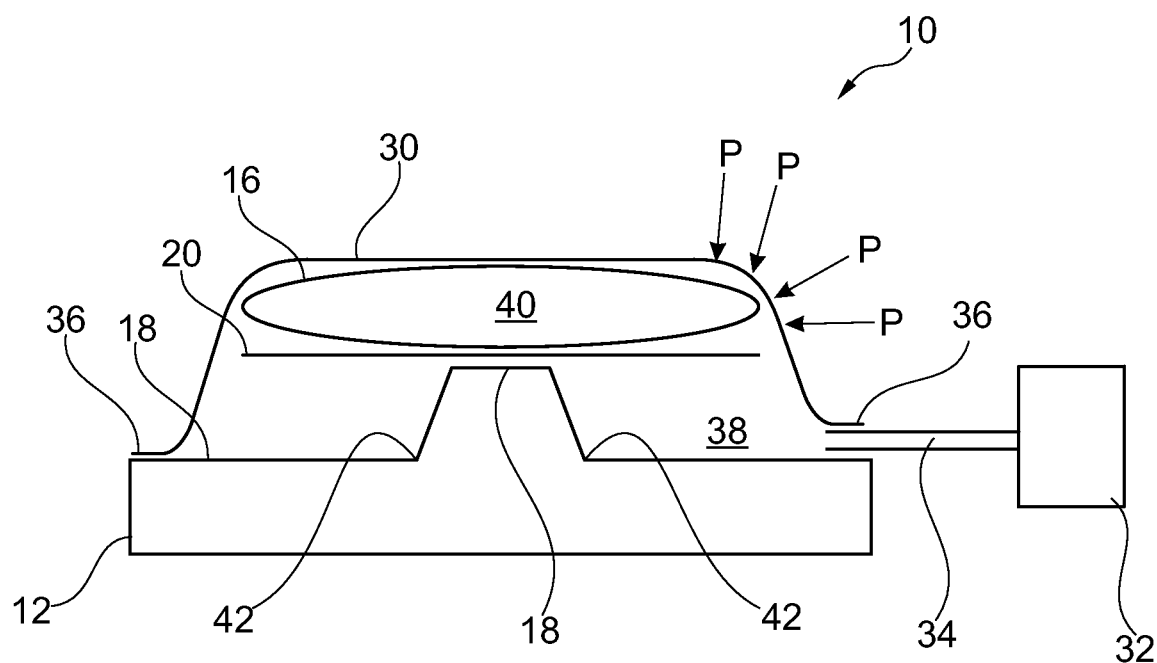
FIGS. 3a and 3b show a further embodiment example of a shaping apparatus according to the present invention in two states during the shaping operation.

FIG. 3A shows the device 10 in a state in which the semi-finished product 20, here indicated by a continuous line, is laid on the support surface 18 of the lay-on unit 12, and moreover the pressure application unit 16 already lies on the semi-finished product 20. Moreover, the vacuum membrane 30 is positioned above the pressure application unit 16 in such a way that the membrane 30 is connected to the lay-on unit 12 in lateral edge regions 36. On the right-hand edge region 36, the connection 34 of the vacuum unit 32 is schematically shown. Moreover, the letters P as well as associated arrows indicate how air pressure acts on the vacuum membrane 30, but this has no effect in the initial state, because the same air pressure is also prevalent in the region that encloses the vacuum membrane 30, identified with reference numeral 38. An effect of the air pressure P is not achieved until a negative pressure is applied through the vacuum unit 32.

Figure 3B:
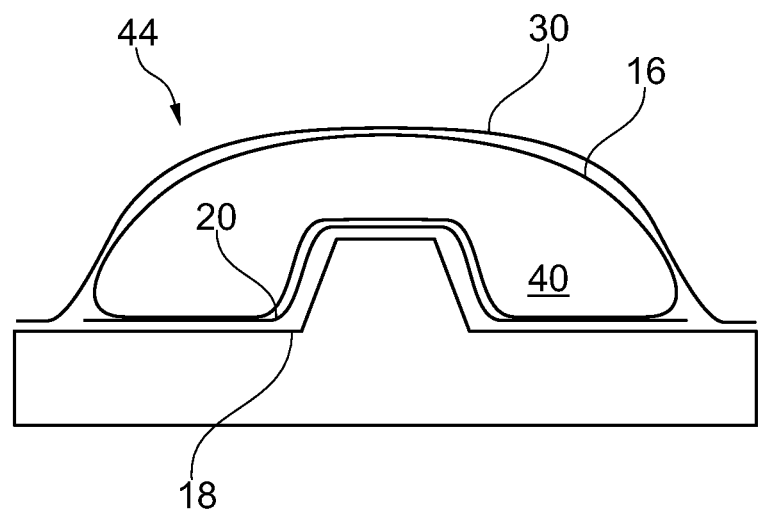

FIG. 3B shows a state in which the semi-finished product 20 has been completely shaped and lies against the support surface 18. As a result of this the membrane 30 acts on the pressure application unit 16 and the pressure application unit 16 in turn acts on the semi-finished product 20.

As is also shown in FIG. 3B, the pressure application unit has for example, a volume 40 that, when the pressure application unit lies on the support surface 18 or on the semi-finished product 20 that lies fully thereon, all of the recesses of the support surface, as identified in FIG. 3A with reference numeral 42, are filled by the pressure application unit 16, so that the vacuum membrane forms a convex enveloping surface 44.

Figure 4:
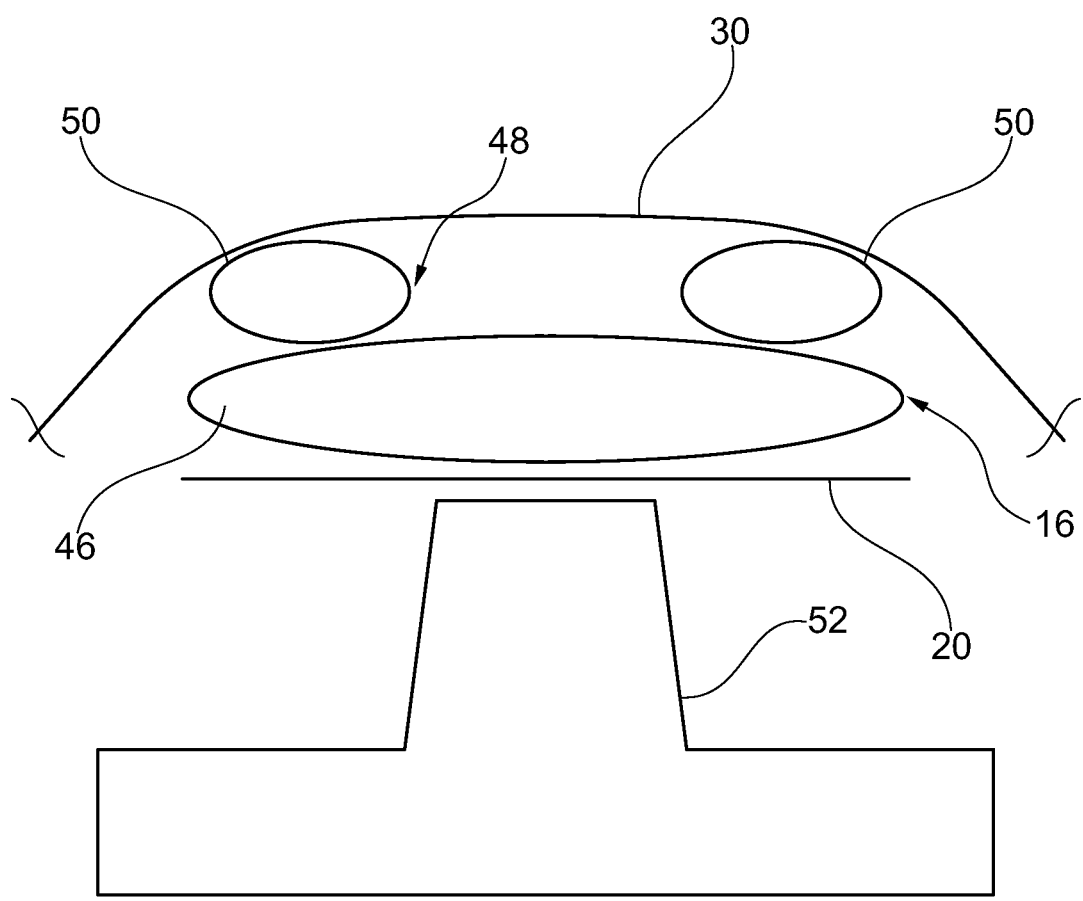
FIG. 4 shows a further embodiment example of a shaping apparatus according to the present invention.

The pressure application unit 16 has for example, a replaceable pressure application element 46, as is shown in FIG. 4.

Moreover, a plurality 48 of pressure application elements 50 may be provided. This is also shown in FIG. 4, however it is pointed out that while the figure shows the replaceability of the pressure application element 46 and the presence of the plurality 48 in combination, they do not necessarily have to be present in this combination. In other words, these two features may also be provided independently from each other and may be combined with other features shown in other figures.

For example, as shown in FIG. 4, a plurality of pressure application elements may be provided above each other in the direction of the applied pressure. Moreover it is possible to provide a plurality of pressure application elements next to each other or one after the other, which however is not shown in any more detail.

For example, a larger pressure application element, for example the pressure application element 46 from FIG. 4, may be combined with two smaller pressure application elements, for example the two pressure application elements 50 in FIG. 4, in order to still effect, in the case of a strong profiling of the support surface 18, for example in the form of a central region 52 that protrudes very far, a corresponding shaping or laying on of the semi-finished product 20.

At this point it should be explicitly mentioned that in the figures, the support surface 18 is formed with a central protruding region, for example for producing a profile with a so-called hat-shaped cross-section, but in addition, other profiles of the support surface 18 are of course also possible, but this is not shown in any further detail. The fact that the figures always refer to a similar profiling of the substrate surface 18 is merely done in order to simplify the explanation and does not mean that this is a central feature of the present invention. Rather, the profiles of the support surface 18 are freely selectable.

In particular, according to the invention also profiles with an undercut, at least to a certain extent, may be provided, because due to the flexible pressure application unit, a clean shaping may be achieved also in the case of such shapes as a result of the fact that the semi-finished product contacts the support surface 18 in a uniform manner throughout (however this is not shown in more detail).

Figure 5A:
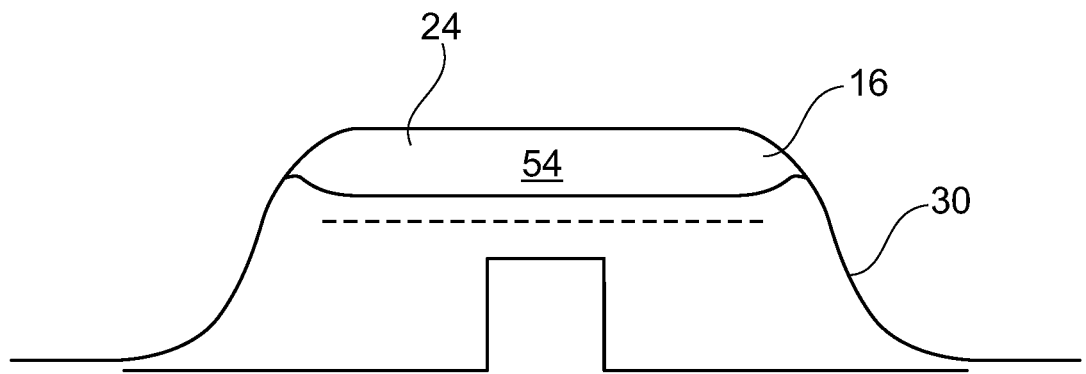
FIGS. 5a and 5b show further embodiment examples of a pressure application unit according to the invention.
Figure 5B:
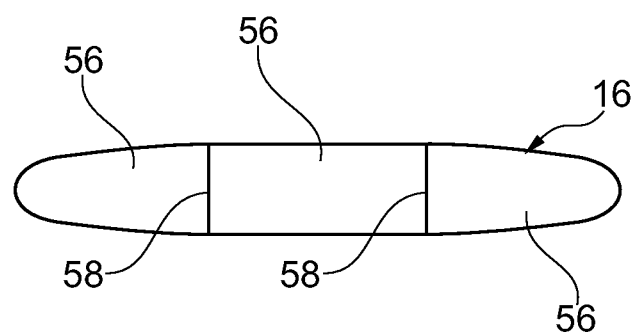

FIG. 5A shows a further embodiment example in which the pressure application unit 16 is integrated in the vacuum membrane 30, for example as a cavity 54 provided with a pressure-transmitting and deformable filling, which is achieved by way of a double-wall design of the vacuum membrane 30.

According to a further embodiment example, the pressure application unit 16 is formed with a plurality of chambers 56 which are separated from each other by a partition 58. The partition 58 can for example, prevent the filling 24 from moving out of the one segment or the one chamber 56 into the adjacent chamber 56 or can get into the adjacent chamber only at a reduced rate or decelerated. As a result, it may for example be avoided that in the case of highly profiled support surfaces, the filling 24 flows off or sinks down in the pressure application unit 16 before the pressure can act on the semi-finished product via the press-on unit 14 in order to shape it.

The filling 24 of the pressure application unit 16 includes, for example, a fluid, a liquid, a gel and/or loose bulk solids.

The use of a liquid provides a pressure-stable filling.

For example, the filling may be a highly viscous filling in order to reduce flowing of the filling 24 in the pressure application unit 16 at least to some degree.

For example, the filling has a dynamic viscosity of at least 100 Pa·s.

For example, the filling may include small spheres which are provided to bulk in the pressure application unit, and these spheres are pressure resistant.

Steps of a method 100 for producing a profiled component will be described below initially with regard to FIG. 6. In a first arrangement step 110, a semi-finished product to be shaped is arranged on a support surface of a lay-on unit. Subsequently, a pressure application unit, which has at least on the side facing the semi-finished product a flexible shell and a pressure-transmitting and deformable filling, is arranged in a second arrangement step 112, which arrangement is carried out on a semi-finished product. In a third arrangement step 114, a press-on unit is arranged on the pressure application unit, which press-on unit has a bendable surface that lies on the pressure application unit and which is used to transmit the force for the shaping onto the pressure application unit. Subsequently, the semi-finished product to be shaped is pressed, in a press-on operation 116, against the support surface by means of the press-on unit via the pressure application unit, and the semi-finished product is shaped in correspondence with the profiling predetermined by the profile of the support surface.

The first arrangement step 110 is also referred to as step (a), the second arrangement step 112 as step (b), the third arrangement step 114 as step (c) and the press-on operation 116 is referred to as step (d).

According to an embodiment example (not shown in detail), the bendable surface of the press-on unit lies on the one side on the pressure application, and on the other side, a pressure can be applied thereto for transmitting the force for the shaping. For the pressure application, the bendable surface forms e.g. a volume that may be filled with a fluid, e.g. a volume onto which pressurized air is applied (see also further below). In a further example, the bendable surface is a vacuum membrane 30. In step (d), a negative pressure is generated in a region between the vacuum membrane and the support surface by a vacuum unit, so that air pressure acting from the outside on the vacuum membrane acts via the pressure application unit and shaping is effected by laying the semi-finished product onto the support surface. The generation of a negative pressure is indicated in FIG. 6 with an additional box 118, but it is explicitly pointed out that this step 118 constitutes a possible option to steps (a) to (d), which is also indicated by a dotted connection line 120 between box 118 and the press-on operation 116.

According to a further example of the method, the bendable surface of the press-on unit is held by holding points in such a way that the bendable surface forms a convex contour both in the shaped state and in the unshaped state, and a tensile stress is applied onto the bendable surface for transmitting the force for the shaping.

Figure 6:
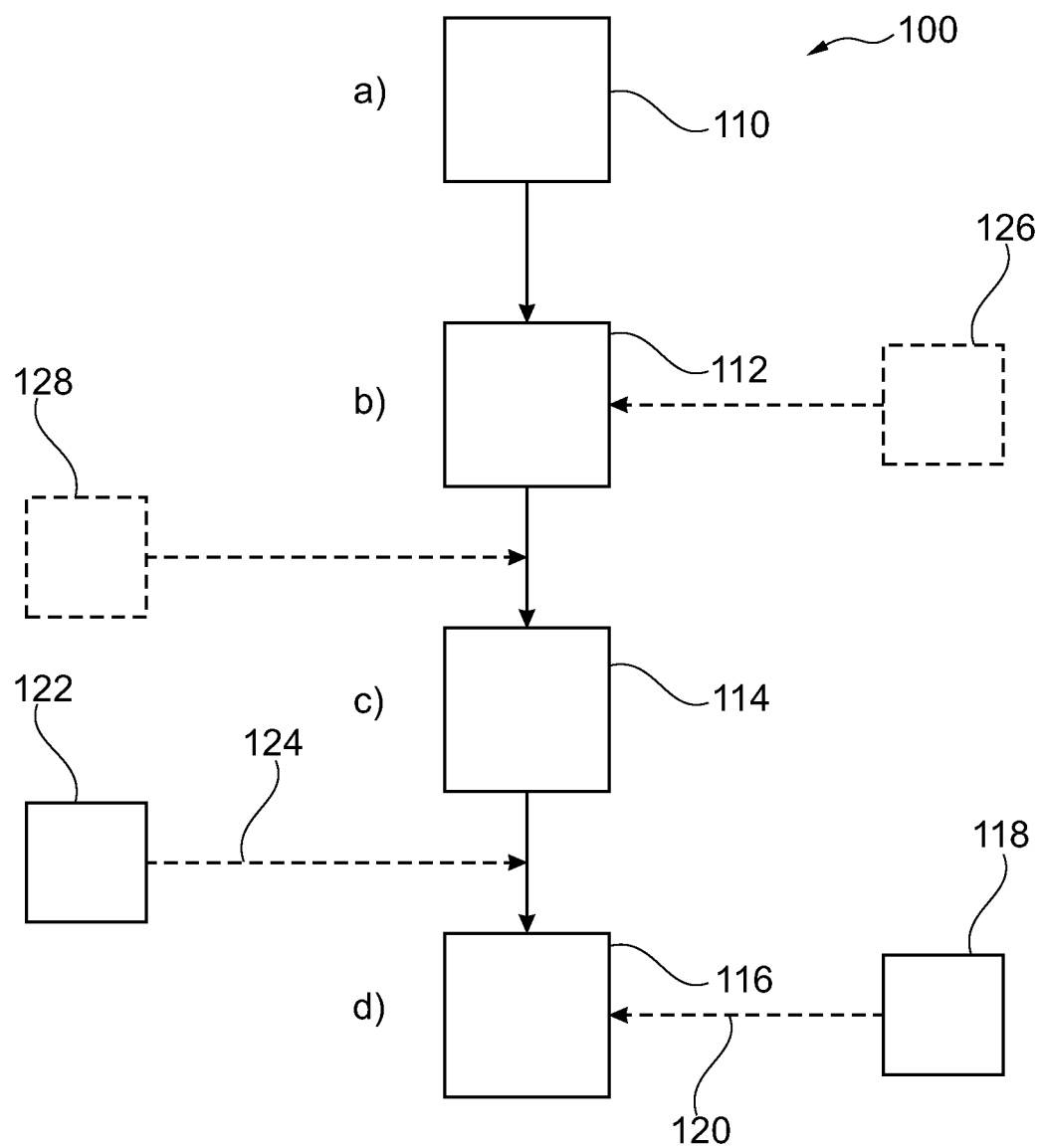
FIG. 6 shows steps of a method for producing a profiled component according to an embodiment example of the invention.

As a further option the semi-finished product may, for example, be softened prior to step (d) by tempering it by means of the pressure application unit, which is indicated in FIG. 6 in an exemplary manner with a further box 122, which is connected, by means of a further dotted connection arrow 124, with steps (a) to (d), wherein the position of the connection arrow 124 indicates that this tempering process is carried out prior to step (d), but it is pointed out that the tempering process may also be provided in connection with step (b), indicated by a further box 126 with a corresponding dotted connection line, or subsequent to step (d) (see further box 128). Since the tempering of the semi-finished product is carried out by means of the pressure application unit 16, the tempering process will always be started with the arrangement in step 112 up to just prior to the press-on operation or to certain extent also during the press-on operation 116.

However, it is to be pointed out that while the tempering process 122 is shown in combination with the features of steps (a) to (d) as well as in combination with the generation of a vacuum, the other features may also be provided without tempering. Also, the tempering may be provided without the generation of a vacuum, for example when the press-on unit is a film that is stretched over the semi-finished product for the shaping process, or in the case of a pressure pad onto which pressurized air or another medium may be applied and which presses against the pressure application unit.

Figure 7:
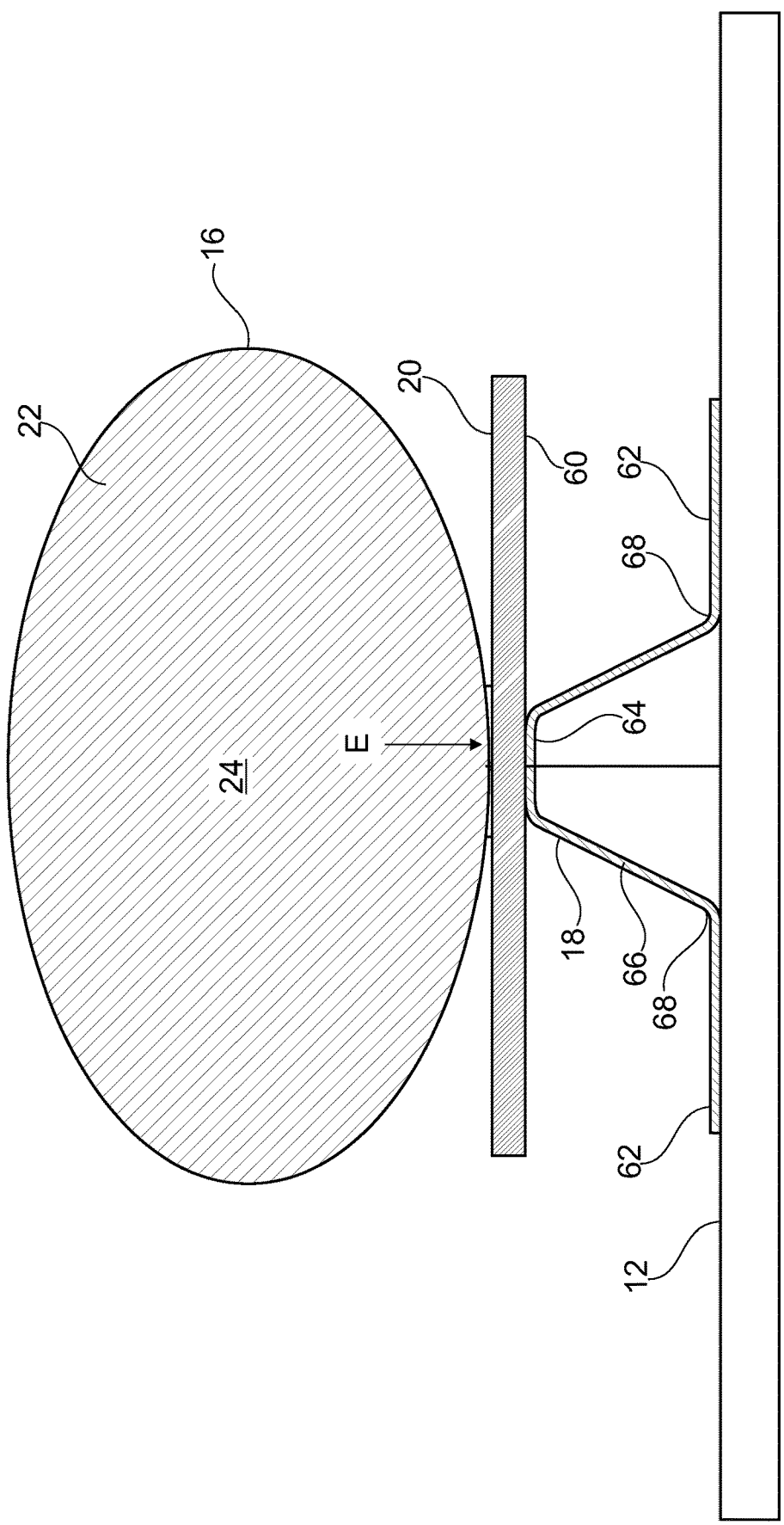
FIGS. 7-9 show schematic views of states during an embodiment example of a method according to the present invention.

FIG. 7 shows a schematic view of the state of an embodiment example in which the semi-finished product to be shaped, which may be, for example, a fiber-reinforced composite material 60, has been laid on top of the support surface 18 of the lay-on unit 12. A profile segment may, for example, be provided as the support surface 18, which profile segment forms a template counter-piece for shaping the semi-finished product 20 to be shaped. As shown in FIG. 7, the profile, or the support surface 18, has two lateral, flat regions 62 as well as a central raised, flat region 64, wherein in each case an inclined transitional region 66 is provided between the flat, lateral region 62 and the central, raised, flat region 64. Accordingly, this profile shape has interior edge regions 68 which may also be referred to as concave shape regions.

Above the semi-finished product 20, the pressure application unit 16 with the bendable shell 22 and the pressure-transmitting and deformable filling 24 is indicated by an elliptic shape. Due to the bendable shell 22, the shell 22 will come to lie, e.g. due to gravity, on the semi-finished product 20, so that the semi-finished product can already be heated, for example, if the pressure application unit has been tempered, in order to supply or dissipate in this way thermal energy, indicated by an arrow and the letter E, for example in order to cool the semi-finished product 20 by means of a pre-cooled pressure application unit 16, for example, in order to reach a certain degree of rigidity of the semi-finished product 20.

Figure 8:
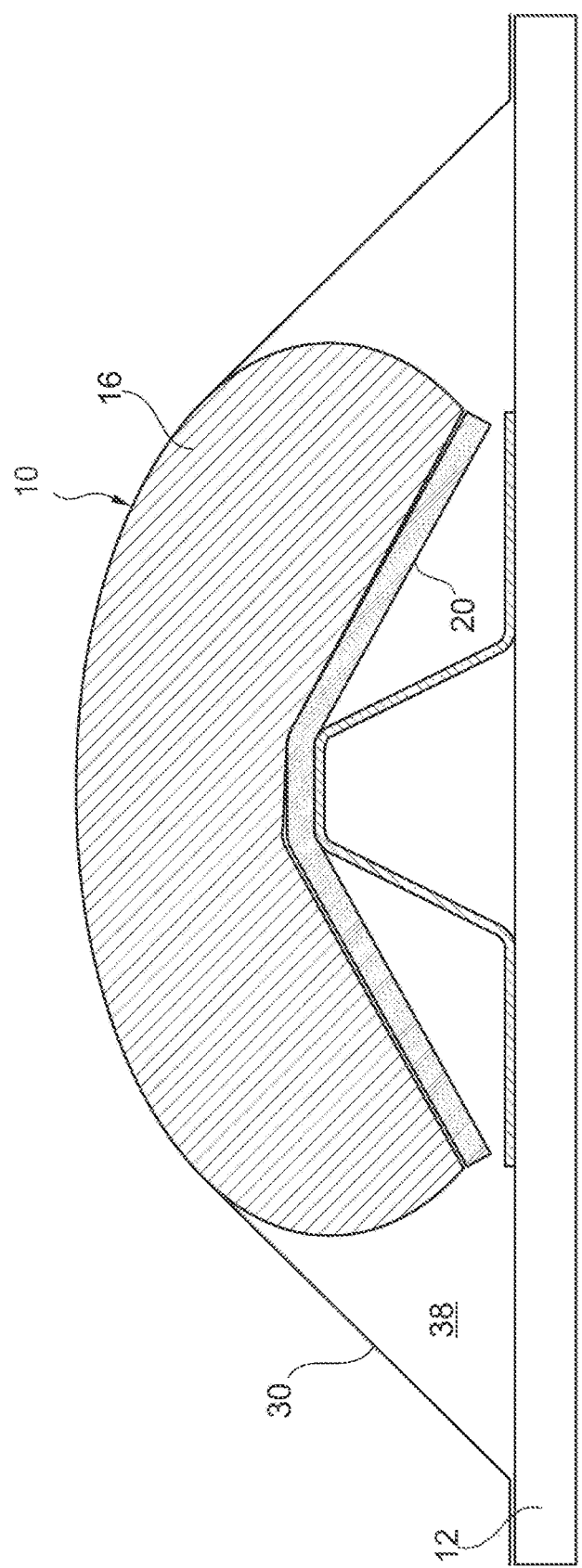

Subsequently, the vacuum membrane 30 is, for example, laid over the pressure application unit 16 and is connected to the lay-on unit 12 or the support surface 18 or the extension thereof, as is schematically shown in FIG. 8. In FIG. 8, the semi-finished product 20 has already been partially deformed, as is shown by it being, as it were, laterally folded down. In other words, the state shown in FIG. 8 already indicates that a negative pressure has been generated in the region 38 between the membrane 30 and the lay-on unit 12 in such a way that the air pressure acting from the outside, which is only schematically indicated with an arrow P, effects that the semi-finished product is shaped.

Figure 9:
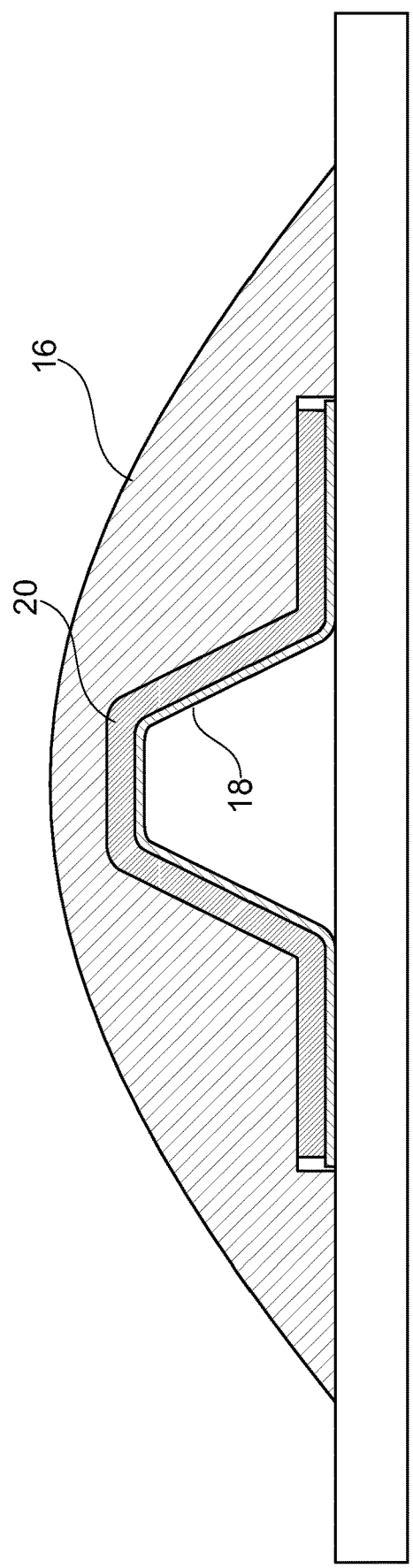

If further negative pressure is now generated, the pressure application unit 16 will be caused to lie intimately fully against the semi-finished product 20 and will cause the semi-finished product 20 to lie against the support surface 18, so that the semi-finished product 20, as shown in FIG. 9, is completely shaped. In particular, the semi-finished product 20 will here be uniformly pressed against the internal radii of the recesses 68.

It should be noted that the illustrations of FIGS. 7 to 9 are schematic and the shape of the pressure application unit 16 may also deviate therefrom, in particular in connection with FIG. 9, where the application unit 16 runs into the lateral interstices. Of course, also another transition from the vacuum membrane, which rests on the lay-on unit 12 and subsequently covers the pressure application elements or the pressure application unit 16, may also be provided here or may develop.

Once the semi-finished product 20 has been completely shaped, cooling may be provided by means of the heat-controllable pressure application unit 16, for example by means of cooling or heating elements introduced into the pressure application unit 16, which cool the semi-finished product in order to ensure that the semi-finished product keeps its contour.

Thus, for example, semi-finished products may be shaped that are stable in shape at normal processing temperatures and will be heated and softened by the shaping process by the pressure application unit 16 only to such a degree that the shaping process can take place. The subsequent cooling will then result in a shaped semi-finished product that can be supplied to further operating steps, for example a further processing step, for example a curing process.

The semi-finished product 20 to be shaped may in particular be a composite laminate.

FIG. 10 shows a further example wherein the bendable surface 26 of the press-on unit lies on the one side on the pressure application unit 16, and on the other side, pressure can be applied thereto via a fluid for transmitting the force for the shaping. The side lying on the pressure application unit 16 is identified with reference sign 72 and the other side with reference sign 74. For the pressure application, the bendable surface 26 forms a volume 76 onto which pressure can be applied. For example, the bendable surface 26 is a film that is sealingly fastened to a holder 78, so that pressurized air, but also another medium or fluid, e.g. water, can be applied onto the volume 76, in order to press the pressure application unit 16 against the semi-finished product 20 to be shaped.

For example, the holder 78 of the film is kept immobile during the shaping process, and the volume 76 is increasingly filled with pressurized air or another medium. In another example, the holder 78 of the film is held immobile during the shaping process and is guided in the direction of the shaping movement. In this process, the volume 76 can be increasingly filled with pressurized air or may be under a more or less constant pressure.

FIG. 11 shows an example wherein the volume 76 formed by the bendable surface 26 has expanded to such a degree that the semi-finished product 20 lies, as a result of the pressure application unit 16, completely against the support surface 18. External borders 80 may be provided in order to focus the effect of the expansion of the volume 76 onto the shaping.

FIG. 12 shows a further example wherein the bendable surface formed e.g. as a film 82 is held by a first lateral edge 84 on a base surface 86, on which the support surface 18 of the lay-on unit is provided. The film 82 is now laid over the semi-finished product 20 to be shaped, and a tensile stress 90 is applied onto a second lateral edge 88, so that the film 82 exerts a compression force onto the pressure application unit 16, which ultimately acts on the semi-finished product. This example is in particular suitable for longer components, if the fixing and also the introduction of a tensile stress can be carried out on the two longitudinal sides.

In a further example (not shown), a tensile force is applied onto the bendable surface, e.g. the film 82, on two sides, e.g. on the two sides or on the circumferential edges, in order to generate the compression force that acts on the pressure application unit 16.

Finally, FIG. 13 shows another example wherein the bendable surface 26, e.g. the film 82, is held on a holding structure 92, e.g. a frame, by at least two opposite edges. Holding may also take place on more sides, in particular all around. The holding structure 92 may also be a box-shaped holder that forms a container that is open at the bottom. The opening is closed e.g. using the film. In order to press the pressure application unit 16 on, the holding structure 92 is moved downwards or in the direction of the semi-finished product. The film may e.g. be elastic and may come to lie on the pressure application unit 16, so that pressure can be increasingly applied, which ultimately leads to the shaping of the semi-finished product. The film may also be formed to be non-elastic, i.e. so as to be tensile-resistant, and in this case the holding points have to be yielding in order to ensure length compensation, so that the film can come to lie against the contour (which changes during the shaping process) of the pressure application unit 16. The holding arms may for example be yielding or may be pivotable, pretensioned using a spring, in order to achieve resilience.

By means of the pressure application unit 16 according to the invention, a simple and yet precise shaping of the semi-finished product may be achieved, for example, with the use of a vacuum membrane, so that not only time is saved, but the product can also be adapted to the predetermined contour in a more precise manner. The use of a flexible pressure application unit also provides the advantage that even in the case of a not absolutely exact positioning of the pressure application unit on the semi-finished product, the shaping process will still be precise. If a tempered pressure application unit is provided, for example by using a gel with a heat storage capacity as high as possible, any additional heat input devices, for example through radiation input, may be dispensed with which means a further simplification during the shaping process for producing a profiled component.

The embodiment examples described above may be combined in various ways. In particular, aspects of the method may also be used for embodiments of the devices as well as the use of the devices, and vice versa.

In addition it is to be pointed out that "comprising" does not exclude any other elements or steps, and "a/an" does not exclude a plurality. It is further to be pointed out that features or steps which have been described with reference to one of the above embodiment examples, can also be used in combination with other features or steps of other embodiment examples as described above. Reference signs in the claims are not to be regarded in a limiting sense.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A shaping device for producing a profiled component, the shaping device comprising:
   a lay-on unit;
   a press-on unit; and
   a pressure application unit;
   wherein the lay-on unit includes a support surface arranged for laying on a semi-finished product to be shaped,
   wherein the press-on unit is provided for pressing the semi-finished product to be shaped onto the support surface,
   wherein the pressure application unit has, at least on a side facing the semi-finished product, a bendable shell that lies against the semi-finished product in an unshaped first state and that lies on in a shaped second state, and the pressure application unit has a pressure-transmitting and deformable filling,
   wherein the pressure application unit is arranged between the press-on unit and a semi-finished product to be shaped,
   wherein the press-on unit has a bendable surface lying on the pressure application unit, wherein the bendable surface transmits a force for shaping onto the pressure application unit,
   wherein the pressure application unit is integrated into the bendable surface,
   wherein the pressure application unit and the bendable surface together form a double-walled structure filled with the pressure-transmitting and deformable filling, and
   wherein the pressure application unit comprises a plurality of chambers separated from each other by a plurality of partitions that provide reduced flow rate or that reduce or completely stop movement of said filling between the plurality of chambers.

2. The device of claim 1, wherein the semi-finished product to be shaped is a fibre-reinforced composite material.

3. The device of claim 1, wherein
   the bendable surface of the press-on unit lies on one side on the pressure application unit, and on another side a pressure is applied via a fluid that transmits the force for the shaping; and
   for the pressure application unit
   i) the bendable surface forms a volume onto which pressure can be applied; or
   ii) the bendable surface is a vacuum membrane; and a vacuum unit is provided to generate a negative pressure in a region between the vacuum membrane and the support surface in such a way that ambient air pressure acting from outside on the vacuum membrane effects a shaping by pressing the semi-finished product onto the support surface.

4. The device of claim 1, wherein the bendable surface of the press-on unit is held by holding points in such a way that the bendable surface forms a convex contour both in the unshaped first state and in the shaped second state, wherein a tensile stress is applied onto the bendable surface for transmitting the force for the shaping.

5. The device of claim 1, wherein the pressure application unit is circumferentially provided with a bendable shell.

6. The device of claim 1, wherein the filling is at least one member of the group of:
gaseous fluids;
liquids;
gels; and
loose bulk solids.

7. The device of claim 6, wherein the filling of the pressure application unit has a dynamic viscosity of at least 100 Pa·s.

8. The device of claim 3, wherein the pressure application unit has such a volume that when the pressure application unit lies on the support surface, all recesses of the support surface are filled by the pressure application unit, so that the vacuum membrane forms a convex enveloping surface.

9. The device of claim 1, wherein the pressure application unit includes
a replaceable pressure application element; or
a plurality of pressure application elements.

10. The device of claim 1, wherein
the semi-finished product is tempered by the pressure application unit; and
the pressure application unit supplies and dissipates thermal energy to and from the semi-finished product to be shaped.

11. The device of claim 1, wherein the support surface is replaceable and various surface profiles can be inserted.

* * * * *